US011805201B2

(12) United States Patent
Zeniya

(10) Patent No.: US 11,805,201 B2
(45) Date of Patent: Oct. 31, 2023

(54) CALL PROCESSING APPARATUS, CALL PROCESSING METHOD, CALL PROCESSING SYSTEM AND CALL PROCESSING PROGRAM

(71) Applicant: Nippon Telegraph and Telephone Corporation, Tokyo (JP)

(72) Inventor: Yoshihiko Zeniya, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/788,451

(22) PCT Filed: Dec. 27, 2019

(86) PCT No.: PCT/JP2019/051405
§ 371 (c)(1),
(2) Date: Jun. 23, 2022

(87) PCT Pub. No.: WO2021/131016
PCT Pub. Date: Jul. 1, 2021

(65) Prior Publication Data
US 2023/0035753 A1 Feb. 2, 2023

(51) Int. Cl.
*H04M 3/436* (2006.01)
*H04M 3/42* (2006.01)

(52) U.S. Cl.
CPC ..... *H04M 3/4365* (2013.01); *H04M 3/42068* (2013.01)

(58) Field of Classification Search
CPC .......... H04M 3/4365; H04M 3/42068
(Continued)

(56) References Cited

U.S. PATENT DOCUMENTS 5,590,186 A * 12/1996 Liao ................. H04M 3/42306
379/212.01
10,523,814 B1 * 12/2019 Moore ................. H04M 3/493
(Continued)

FOREIGN PATENT DOCUMENTS

JP     2016103800      6/2016
WO  WO 2017199555   11/2017

OTHER PUBLICATIONS

Nippon Telegraph and Telephone West Corporation, "Hikari Denwa (IP phone service) Unsolicited call Notice service," FLET's NTT West Official Homepage, 2019, retrieved from URL <https://flets-w.com/opt/hikaridenwa/service/okotowari/>, 13 pages.

*Primary Examiner* — Binh Kien Tieu
(74) *Attorney, Agent, or Firm* — Fish & Richardson P.C.

(57) ABSTRACT

A call processing server 10 includes a registration unit 12 that receives a registration request of a suspicious call number from a user receiving a suspicious call to register the suspicious call number in a subscriber information storage unit 22, and a call processing unit 11 that refers to the subscriber information storage unit 22 to control an incoming call, in which the call processing unit 11 transmits, when an outgoing source of a call is the suspicious call number registered in the subscriber information storage unit 22, an alert guidance to an incoming destination terminal 5 before connecting the call, and the suspicious call number registered in the subscriber information storage unit 22 is shared by all users set in the subscriber information storage unit 22.

9 Claims, 8 Drawing Sheets

(58) Field of Classification Search
USPC .................................................... 379/142.06
See application file for complete search history.

(56) References Cited

U.S. PATENT DOCUMENTS

| | | | | |
|---|---|---|---|---|
| 2004/0203835 | A1* | 10/2004 | Trottier | H04M 1/576 |
| | | | | 455/454 |
| 2009/0304167 | A1* | 12/2009 | Wright | H04M 3/436 |
| | | | | 379/142.05 |
| 2010/0267402 | A1* | 10/2010 | Avasarala | H04L 51/212 |
| | | | | 455/466 |
| 2012/0014374 | A1* | 1/2012 | Yaniro, Jr. | H04L 45/308 |
| | | | | 370/352 |
| 2014/0270125 | A1* | 9/2014 | Khan | H04M 3/38 |
| | | | | 379/189 |
| 2015/0288791 | A1* | 10/2015 | Weiss | H04M 1/663 |
| | | | | 379/189 |
| 2019/0149665 | A1 | 5/2019 | Morishita | |

* cited by examiner

Fig. 3

| PHONE NUMBER OF USER | SUSPICIOUS CALL INFORMATION (1) | | | PRESENCE/ ABSENCE OF CONTRACT |
|---|---|---|---|---|
| | PRESENCE/ ABSENCE OF INCOMING CALL | PHONE NUMBER | PRESENCE/ ABSENCE OF REGISTRATION | |
| A1 | ABSENT | — | ABSENT | PRESENT |
| A2 | ABSENT | — | ABSENT | PRESENT |
| A3 | ABSENT | — | ABSENT | PRESENT |
| ... | ... | ... | ... | ... |
| A100 | ABSENT | — | ABSENT | ABSENT |

Fig. 4

| PHONE NUMBER OF USER | SUSPICIOUS CALL INFORMATION (1) | | | PRESENCE/ ABSENCE OF CONTRACT |
|---|---|---|---|---|
| | PRESENCE/ ABSENCE OF INCOMING CALL | PHONE NUMBER | PRESENCE/ ABSENCE OF REGISTRATION | |
| A1 | ABSENT | — | ABSENT | PRESENT |
| A2 | PRESENT | B | PRESENT | PRESENT |
| A3 | ABSENT | — | ABSENT | PRESENT |
| ... | ... | ... | ... | ... |
| A100 | ABSENT | — | ABSENT | ABSENT |

Fig. 5

| PHONE NUMBER OF USER | SUSPICIOUS CALL INFORMATION (1) | | | PRESENCE/ ABSENCE OF CONTRACT |
|---|---|---|---|---|
| | PRESENCE/ ABSENCE OF INCOMING CALL | PHONE NUMBER | PRESENCE/ ABSENCE OF REGISTRATION | |
| A1 | PRESENT | B | ABSENT | PRESENT |
| A2 | PRESENT | B | PRESENT | PRESENT |
| A3 | PRESENT | B | ABSENT | PRESENT |
| ... | ... | ... | ... | ... |
| A100 | PRESENT | B | ABSENT | ABSENT |

CALL PROCESSING APPARATUS, CALL PROCESSING METHOD, CALL PROCESSING SYSTEM AND CALL PROCESSING PROGRAM

CROSS-REFERENCE TO RELATED APPLICATIONS

This application is a National Stage application under 35 U.S.C. § 371 of International Application No. PCT/JP2019/051405, having an International Filing Date of Dec. 27, 2019, the disclosure of which is considered part of the disclosure of this application, and is incorporated in its entirety into this application.

TECHNICAL FIELD

The present disclosure relates to a call processing apparatus, a call processing method, a call processing system, and a call processing program.

BACKGROUND ART

In recent years, the number of occurrences of communications fraud has been significantly increasing, thereby demanding countermeasures for nuisance calls and suspicious calls in network systems. As one of the countermeasures, a carrier provides a nuisance call blocking service (NPL 1). In the nuisance call blocking service, a user registers a phone number of a certain call as a "nuisance call" after receiving the certain call.

CITATION LIST

Non Patent Literature

NPL 1: NTT West, "Nuisance Call Blocking Service", [online], the Internet <URL: https://flets-w.com/opt/hikar-idenwa/service/okotowari/> JP 2018-026744 A

SUMMARY OF THE INVENTION

Technical Problem

In the nuisance call blocking service of NPL 1, each user registers a nuisance call after having received the nuisance call. In other words, the user is required at least once to receive the nuisance call. Thus, even when the other users have already registered the nuisance call, the user is not aware, at the first time of receiving a call, that the call corresponds to the nuisance call.

In view of the respects described above, an object of the present disclosure is to provide a call processing apparatus, a call processing method, a call processing system, and a call processing program, each configured to notify a user that a phone number of a call received corresponds to a suspicious call even when the user has not previously received the call from the phone number.

Means for Solving the Problem

In order to achieve the object, an aspect of the present disclosure provides a call processing apparatus including a registration unit that receives a registration request of a suspicious call number from a user receiving a suspicious call to register the suspicious call number in a subscriber information storage unit, and a call processing unit that refers to the subscriber information storage unit to control an incoming call, in which the call processing unit transmits, when an outgoing source of a call is the suspicious call number registered in the subscriber information storage unit, an alert guidance to an incoming destination terminal before connecting the call, and the suspicious call number registered in the subscriber information storage unit is shared by all users set in the subscriber information storage unit.

An aspect of the present disclosure provides a call processing method performed by a call processing apparatus, the call processing method including receiving a registration request of a suspicious call number from a user receiving a suspicious call to register the suspicious call number in a subscriber information storage unit, and referring to the subscriber information storage unit to control an incoming call, in which the referring includes transmitting, when an outgoing source of a call is the suspicious call number registered in the subscriber information storage unit, an alert guidance to an incoming destination terminal before connecting the call, and connecting the call to an incoming destination terminal, and the suspicious call number registered in the subscriber information storage unit is shared by all users set in the subscriber information storage unit.

An aspect of the present disclosure provides a call processing program to cause a computer to operate as the call processing apparatus.

Effects of the Invention

The present disclosure provides a call processing apparatus, a call processing method, a call processing system, and a call processing program, each configured to notify a user that, even when the user has not previously received the call from a phone number, the phone number of the call is the suspicious call.

BRIEF DESCRIPTION OF DRAWINGS

FIG. 3 is a diagram showing an example of user attribute information.

FIG. 4 is a diagram showing another example of the user attribute information.

FIG. 5 is a diagram showing still another example of the user attribute information.

DESCRIPTION OF EMBODIMENTS

Hereinafter, an embodiment of the present disclosure will be described with reference to the drawings.

Configuration of Call Processing System

Figure 1:
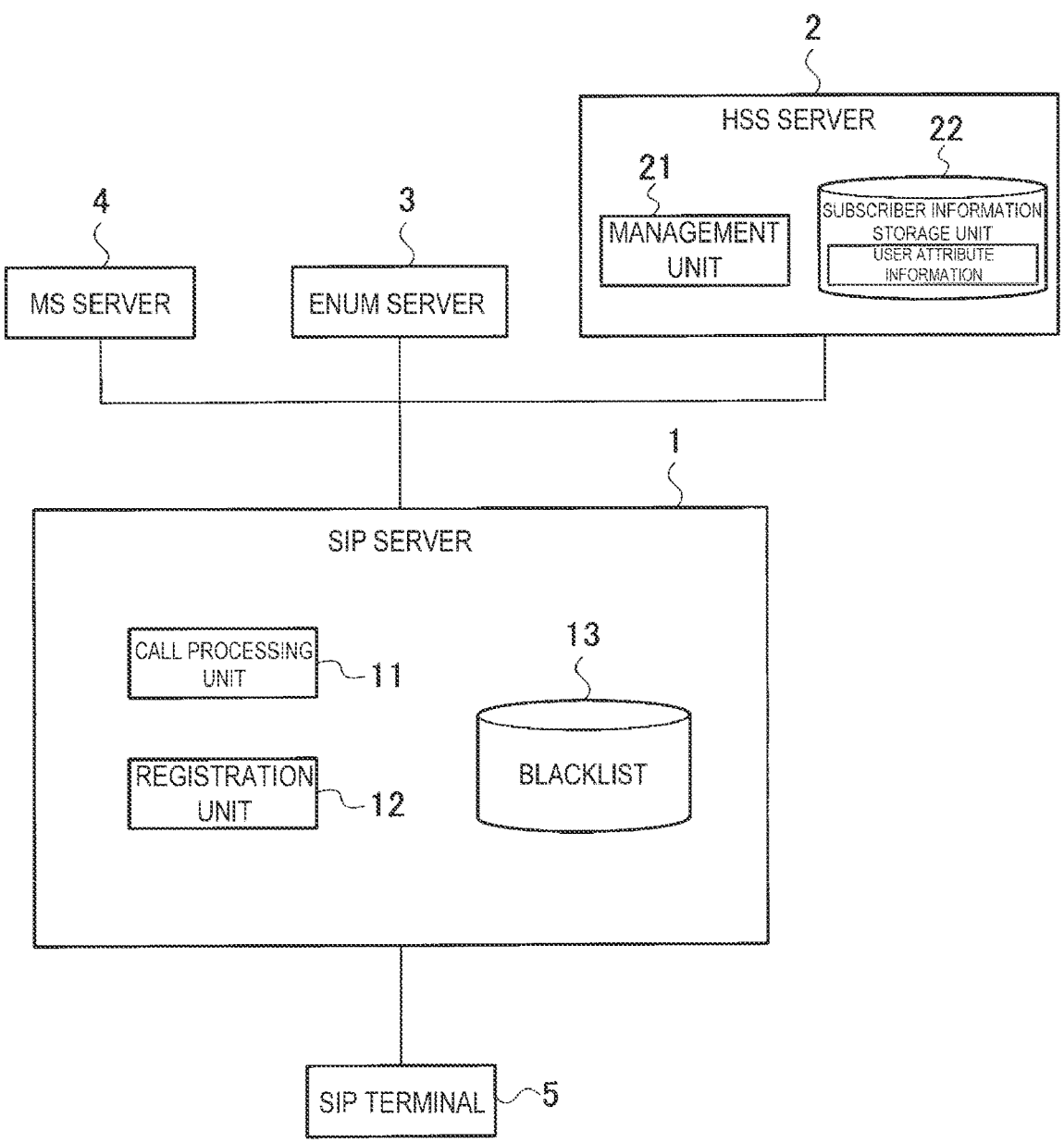
FIG. 1 is an overall configuration diagram illustrating a configuration of a call processing system according to an embodiment of the present disclosure.

FIG. 1 is an overall configuration diagram illustrating a configuration of a call processing system according to the present embodiment. In the present embodiment, subscriber information (user profile information) in a home subscriber server (HSS) server is extended, a registration of a suspicious call made by a called party is registered in the subscriber information as suspicious call information, and the suspicious call information is shared by all of the subscribers.

The call processing system in FIG. 1 includes a session initiation protocol (SIP) server 1, an HSS server 2, an E.164 number mapping (ENUM) server 3, a media server 4, and a SIP terminal 5.

The SIP server (a call processing apparatus) 1 processes a call on an Internet protocol (IP) phone network using the session initiation protocol. More specifically, the SIP server 1 manages user identification information, such as a phone number, and an IP address, and connects the call between an outgoing terminal and an incoming terminal. The SIP server 1 in FIG. 1 includes a call processing unit 11, a registration unit 12, and a blacklist 13.

The call processing unit 11 refers to a subscriber information storage unit 22 to control an incoming call. More specifically, when the outgoing source of the call is a suspicious call number registered in the subscriber information storage unit 22, the call processing unit 11 transmits an alert guidance to the SIP terminal 5 of the incoming destination before connecting the call.

In the present embodiment, the call processing unit 11 accesses the HSS server 2 every time receiving a call from an SIP server of outgoing end (not shown) or the SIP terminal 5, acquires a user attribute related to a phone number of the incoming call from the subscriber information storage unit 22 included in the HSS server 2, and implements call processing in accordance with the user attribute. The call processing in accordance with the user attribute includes, for example, typical call processing to connect the call directly to the SIP terminal 5 of the incoming destination, call processing to transmit the alert guidance to the SIP terminal 5 of the incoming destination before connecting the call, and call processing to disconnect the call without connecting (receiving) the call to the SIP terminal 5 of the incoming destination.

The call processing unit 11 may disconnect a call from a suspicious call number registered in the blacklist 13. Further, when an incoming destination of the call from the suspicious call number registered in the blacklist 13 is an SIP terminal 5 of a contract user contracting a suspicious call rejection service, the call processing unit 11 may disconnect the call, and when the incoming destination of the call is not the SIP terminal 5 of the contract user, the call processing unit 11 may transmit the alert guidance to a SIP terminal 5 of incoming destination before connecting the call.

The registration unit 12 receives a registration request of the suspicious call number from the user that has received the suspicious call and registers the suspicious call number in the subscriber information storage unit 22. The contract user having the contract with the suspicious call rejection service such as in NPL 1 (nuisance call blocking service) can register the suspicious call in the SIP server 1 by performing a predetermined operation after having received the suspicious call. When the contract user registers the suspicious call, the means of registering is not limited to that of NPL 1. The contract user may alternatively register the suspicious call via other means, such as a web browser or an application. The suspicious call information in which the registration unit 12 registers in the subscriber information storage unit 22, is to be shared by all of the users (subscribers) set in the subscriber information storage unit 22.

The registration unit 12 may register the suspicious call number in the blacklist, when the number of the users that have sent the registration requests of the suspicious call number exceeds a threshold predetermined (first threshold).

The registration unit 12 may register the suspicious call number in the blacklist, when the number of incoming calls from the suspicious call number exceeds a threshold predetermined (second threshold).

In the blacklist 13, the suspicious call numbers are registered. More specifically, the blacklist 13 may include a phone number of a suspicious person (malicious person), when the number of the contract users that have registered the suspicious call exceeds the threshold predetermined. Further, the blacklist 13 may include the suspicious call number when the number of incoming calls from the suspicious call number exceeds the threshold predetermined.

Still further, the blacklist 13 may include, in advance, the phone numbers used in crimes such as communications fraud obtained from external agencies, such as the police, public security, or other related agencies. In the present embodiment, instead of simply using the blacklist obtained from the external agencies, the registration unit 12 updates the blacklist 13 in accordance with the status of receiving the suspicious calls occurring on a daily basis, so that the blacklist 13 is prevented from becoming obsolete.

The HSS server 2 (subscriber server) is a server configured to manage the subscriber information (user profile information). The subscriber information corresponds to information related to each of the subscribers, such as a phone number, a name, and an address of the corresponding subscriber. In the present embodiment, the subscriber information is extended to manage user attribute information as a part (subset) of the subscriber information, as will be described below.

The HSS server 2 of the present embodiment includes a management unit 21 and the subscriber information storage unit 22. The management unit 21 registers (reflects) the suspicious call numbers, which have been specified by the registration requests of the suspicious calls, in the subscriber information for all of the users set in the subscriber information storage unit 22.

When a SIP terminal 5 receives a call from the suspicious person and the user of the SIP terminal 5 registers the call as the suspicious call the SIP server 1, the SIP server 1 accesses the HSS server 2 to update the suspicious call information related to the user. This causes the HSS server 2 to register the suspicious call information in the subscriber information for all of the users other than the user that has sent the registration request of the suspicious call. With this configuration, the suspicious call information is shared by all of the users.

The subscriber information storage unit 22 stores the user attribute information as the part of the subscriber information. The user attribute information includes the phone number, the suspicious call information, presence or absence of the contract with the suspicious call rejection service, and the like related to each of the users. The user attribute information will be described below.

The ENUM server 3 is a server configured to associate the phone number with the IP address. The SIP server 1 routes (forwards) each of the calls via the ENUM server 3.

The media server (MS) 4 holds media, such as voice guidance, therein, and on request from the SIP server 1, transmits the media to the SIP terminal 5. In the present embodiment, under the control of the SIP server 1, the alert guidance, which indicates that a call to be received is the suspicious call, is transmitted to the SIP terminal 5 of the incoming end. With this configuration, on receiving the calls from the suspicious persons, the user is warned.

The SIP terminal 5 is a terminal using the SIP. In the present embodiment, the SIP terminal 5 of the outgoing end is assumed to be the terminal used by the suspicious person (malicious person) that makes a nuisance call, a communications fraud call, such as billing fraud, and the suspicious call, such as a call to collect personal information. The SIP terminal 5 of the incoming end is assumed to be the terminal of the user as the receiver of the suspicious call. The user corresponds to each of all of the users registered in the subscriber information storage unit 22 of the HSS server 2, such as a victim of the communications fraud call, an elderly user, or other general users.

Further, the user includes, not only the contract user having the contract with the suspicious call rejection service, but also a non-contract user not having with the suspicious call rejection service.

Operation of Call Processing System

An operation of the call processing system of the present embodiment will be described below.

Figure 2:
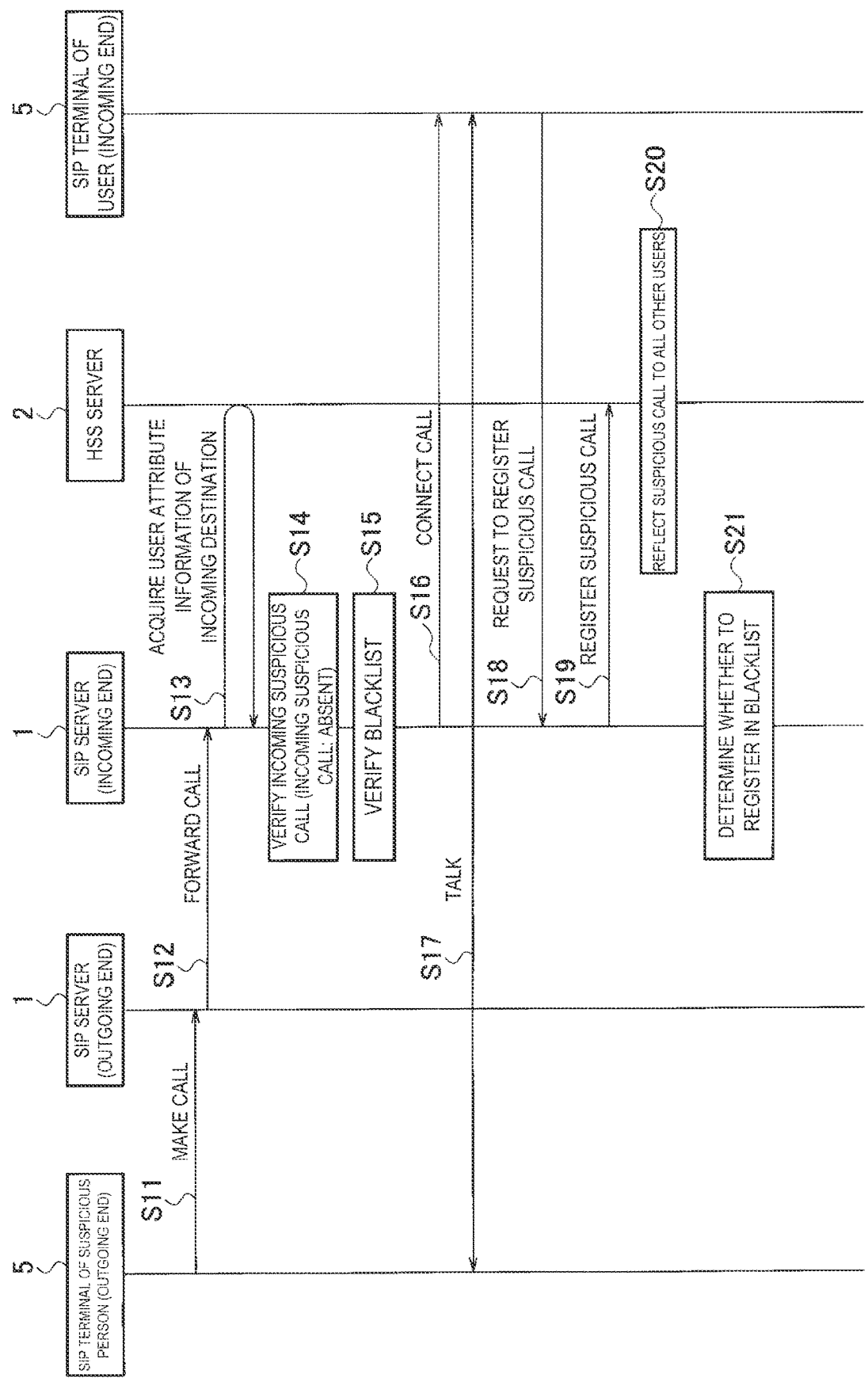
FIG. 2 is a sequence diagram illustrating an operation of the call processing system.

FIG. 2 is a sequence diagram illustrating the operation of the call processing system. In the example of FIG. 2, the SIP terminal of the suspicious person (malicious person) (the terminal of the outgoing end) makes the suspicious call to the SIP terminal of a user (the terminal of the incoming end).

The SIP terminal of the suspicious person (phone number B) makes a call to the SIP terminal of the user (phone number A2) as the incoming destination of the call (S11). The SIP server of the outgoing end forwards the call from the suspicious person to the SIP server of the incoming end using the ENUM server 3 or others (S12). When receiving the call, the SIP server of the incoming end accesses the HSS server 2 and acquires the user attribute information (subscriber information) related to the SIP terminal of the incoming destination (S13).

FIG. 3 is a diagram showing an example of the user attribute information. The user attribute information as the part of the subscriber information (user profile information) corresponds to information registered related to each of the users (subscribers). The user attribute information includes the phone number, the suspicious call information, presence or absence of the contract, and the like related to each of the users. The presence or absence of the contract corresponds to a flag indicating whether the user is the contract user having the contract with the suspicious call rejection service (contract: present) or the non-contract user not having with the suspicious call rejection service (contract: absent).

The suspicious call information includes presence or absence of the incoming suspicious call, the outgoing source phone number of the suspicious call (the suspicious call number), which is supposed to be registered in the case that there is the incoming call, and presence or absence of the registration. The presence or absence of the registration corresponds to a flag indicating whether the contract user has requested the SIP server to register the suspicious call number as the suspicious call. The user attribute information is configured to include a plurality of the suspicious call information.

In the example of FIG. 3, in the suspicious call information related to a user as the incoming destination of the suspicious call (phone number A2), the presence or absence of the incoming suspicious call and the presence or absence of the registration each represent "absent", and the phone number is not registered, indicating that the user has not received the suspicious call.

The SIP server of the incoming end determines whether the user attribute information (suspicious call information), which is related to the SIP terminal of the incoming destination and has been acquired from the HSS server, includes the phone number of the SIP terminal of the outgoing source (S14). In the case shown in FIG. 3, the SIP server determines that the suspicious call information representing the SIP terminal of the outgoing source has not been registered.

Concurrently, the SIP server of the incoming end determines whether the blacklist 13 includes the phone number of the SIP terminal of the outgoing source (S15). Here, the blacklist 13 is assumed not to include the phone number of the SIP terminal of the outgoing source.

Because the phone number of the SIP terminal of the outgoing source has not been registered in the user attribute information acquired from the HSS server 2 and in the blacklist 13, the SIP server of the incoming end connects the call from the suspicious person to the SIP terminal of the incoming destination (S16). In other words, the SIP server performs the typical incoming call processing. Consequently, the call is connected between the SIP terminal of the outgoing source and the SIP terminal of the incoming destination, causing the suspicious person and the user to talk (S17).

When the incoming destination user, having talked with the suspicious person, is the contract user with the suspicious call rejection service, the user sends the registration request to the SIP server 1 to register the SIP terminal of the outgoing source as the suspicious call (S18). The registration request includes the phone number of the user (phone number A2) and the phone number of the suspicious person (phone number B). When receiving the registration request, the SIP server accesses the HSS server, updates the suspicious call information (user attribute information) related to the user that has sent the registration request, and registers the SIP terminal of the outgoing source as the suspicious call (S19).

FIG. 4 shows the user attribute information when the SIP terminal of the suspicious person has been registered as the suspicious call in response to the registration request sent by the user (phone number A2) that has received the suspicious call. As shown in FIG. 4, in the suspicious call information related to the user having the phone number "A2", the presence or absence of the incoming suspicious call represents "present", the phone number represents "B", and the presence or absence of the registration represents "present".

In the HSS server 2, when the suspicious call information related to any one of the users has been updated, the suspicious call information is shared by all of the other users (S20). More specifically, the HSS server 2 reflects the suspicious call information (presence or absence of the incoming suspicious call and the phone number) related to the user sent the registration request in the S19 in the pieces of user attribute information for all the other users. In other words, in the suspicious call information for each of all the other users, the HSS server 2 sets the presence or absence of the incoming suspicious call to "present", and the phone number to "B".

FIG. 5 shows the user attribute information after the HSS server 2 shares the suspicious call information that is registered in response to the registration request sent by the user that has received the suspicious call with the other users.

When having received the registration request of a suspicious call from the SIP terminal, the SIP server determines whether to register the suspicious call in the blacklist 13 (S21). When having received the registration request, the SIP server counts the number of registration requests for each of the suspicious call number. Here, it is assumed that the number of registration requests of the suspicious person (phone number B) in the registration request of S18 is equal to or smaller than the threshold predetermined (first threshold). In this case, the SIP server does not register the phone number of the suspicious person in the blacklist 13.

Figure 6:
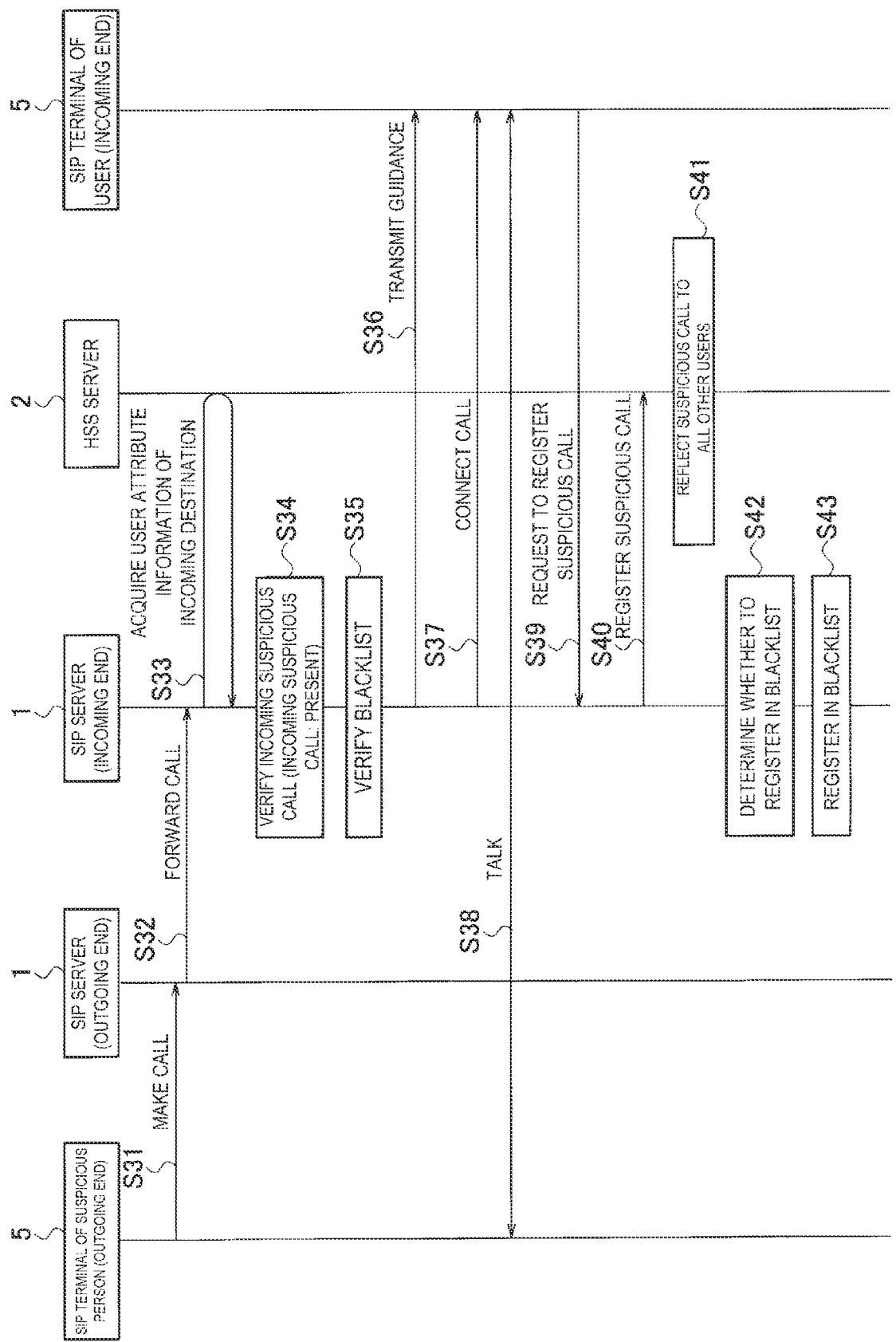
FIG. 6 is a sequence diagram illustrating another operation of the call processing system.

FIG. 6 is a sequence diagram of a case where, in the state of the user attribute information of FIG. 5, the SIP terminal of the suspicious person (phone number B) makes the suspicious call to the SIP terminal of the user (phone number A1). In FIG. 6, S31 to S33 are similar to the S11 to S13 of FIG. 2, and a detailed description thereof will thus be omitted.

In S34, the SIP server of the incoming end determines whether the user attribute information (suspicious call information), which is related to the SIP terminal of the incoming destination and has been acquired from the HSS server, includes the phone number of the SIP terminal of the outgoing source. In the case shown in FIG. 5, the SIP terminal of the outgoing source (phone number B) has been registered in the suspicious call information related to the incoming destination (phone number A1). Accordingly, the SIP server determines that the suspicious call information representing the SIP terminal of the outgoing source has been registered.

Concurrently, the SIP server of the incoming end determines whether the blacklist 13 includes the phone number of the SIP terminal of the outgoing source (S35). Here, the blacklist 13 is assumed not to include the phone number of the SIP terminal of the outgoing source.

In this case, because the phone number of the SIP terminal of the outgoing source has been registered in the user attribute information acquired from the HSS server 2 but has not been registered in the blacklist 13, the SIP server of the incoming end controls, before connecting the call, the media server 4 to transmit the alert guidance to warn the SIP terminal of the incoming destination (S36). Subsequently, the SIP server 1 connects the call from the suspicious person to the SIP terminal of the incoming destination (S37). Consequently, the call is connected between the SIP terminal of the outgoing source and the SIP terminal of the incoming destination, causing the suspicious person and the user to talk (S38). As described above, in the present embodiment, it is possible to notify the user that, even when the user has not previously received the call from a phone number, the phone number of the call corresponds to the suspicious call.

When the incoming destination user, having talked with the suspicious person, is the contract user with the suspicious call rejection service, the user sends the registration request to the SIP server to register the SIP terminal of the outgoing source as the suspicious call (S39). The request for registration includes the phone number of the user (phone number A1) and the phone number of the suspicious person (phone number B).

When receiving the registration request, the SIP server accesses the HSS server, updates the suspicious call information related to the user that has sent the registration request, and registers the SIP terminal of the outgoing source as the suspicious call (S40). Here, because the presence or absence of the incoming call from the suspicious person B and the phone number of the suspicious person B have been registered, only the presence or absence of registration is updated to be "present".

When the suspicious call information related to any one of the users has been updated, the HSS server 2 shares the suspicious call information with all of the other users (S41). However, in the case of FIG. 5, because the presence or absence of the incoming call from the suspicious person (phone number B) and the phone number of the suspicious person (phone number B) are shared by all of the users, the suspicious call information is not updated by the HSS server.

When having received the registration request of the suspicious call from the SIP terminal, the SIP server determines whether to register the suspicious call in the blacklist 13 (S42). When having received the registration request in S39, the SIP server counts the number of registration requests for each of the suspicious call number. Here, it is assumed that the number of registration requests of the suspicious person (phone number B) in the registration request of S39 is greater than the threshold predetermined (first threshold). In other words, the contract users, the number of which is greater than the threshold, are assumed to have sent the registration requests of the suspicious person (phone number B). In this case, the SIP server registers the phone number of the suspicious person in the blacklist 13 (S43).

Figure 7:
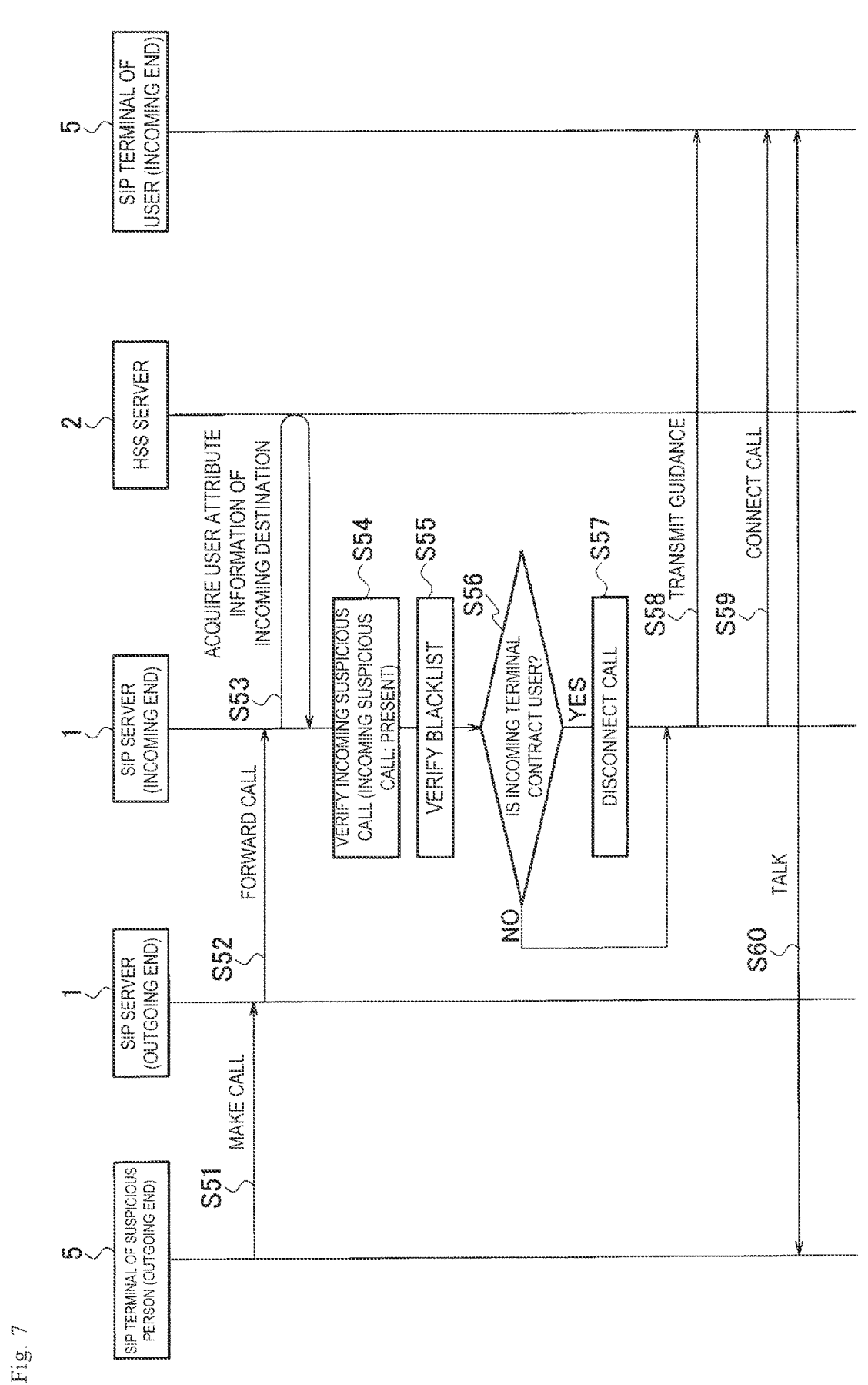
FIG. 7 is a sequence diagram illustrating still another operation of the call processing system.

FIG. 7 is a sequence diagram of a case where, in the state of the user attribute information of FIG. 5, the SIP terminal of the suspicious person (phone number B) registered in the blacklist 13 makes the suspicious call to the SIP terminal of the user (phone number A3). In FIG. 7, S51 to S53 are similar to the S11 to S13 of FIG. 2, and a detailed description thereof will thus be omitted.

In S54, the SIP server of the incoming end determines whether the user attribute information (suspicious call information), which is related to the SIP terminal of the incoming destination and has been acquired from the HSS server, includes the phone number of the SIP terminal of the outgoing source. In the case shown in FIG. 5, the SIP terminal of the outgoing source (phone number B) has been registered in the suspicious call information related to the incoming destination (phone number A3). Accordingly, the SIP server determines that the suspicious call information representing the SIP terminal of the outgoing source has been registered.

Concurrently, the SIP server of the incoming end determines whether the blacklist 13 includes the phone number of the SIP terminal of the outgoing source (S55). Here, the blacklist 13 is assumed to include the phone number of the SIP terminal of the outgoing source.

In this case, the SIP server refers to the user attribute information obtained in S53 to determine whether the user is the contract user (S56). When the user is the contract user (S56: Yes), the SIP server disconnects the call from the phone number registered in the blacklist 13, without performing the incoming processing (S57). In the user attribute information of FIG. 5, because the user (phone number A3) is the contract user, the SIP server disconnects the call.

When the user is the non-contract user (S56: No), the SIP server transmits the alert guidance to warn the user before connecting the call, and then connects the call. More specifically, the SIP server 1 controls the media server 4 to transmit the alert guidance to the SIP terminal of the incoming destination (S58), and then connects the call to the SIP terminal (S59). Consequently, the call is connected between the SIP terminal of the outgoing source and the SIP terminal of the incoming destination, causing the suspicious person and the user to talk (S60).

In each of FIGS. 2, 6, and 7, as described above, the incoming processing is performed for the call from the SIP terminal of the suspicious person. When a general user, not the suspicious person, makes a call, because a phone number of the general user is not registered in the suspicious call information of the user attribute information and the blacklist 13, the SIP server 1 connects the call directly to the incoming destination without transmitting the alert guidance.

Effects of the Present Embodiment

The SIP server 10 described in the foregoing embodiment includes a registration unit 12 that receives a registration request of a suspicious call number from a user that has received a suspicious call to register the suspicious call number in a subscriber information storage unit 22, and a call processing unit 11 that refers to the subscriber information storage unit 22 to control an incoming call, in which the call processing unit 11 transmits, when an outgoing source of a call is the suspicious call number registered in the subscriber information storage unit 22, an alert guidance to an incoming destination terminal 5 before connecting the call, and the suspicious call number registered in the subscriber information storage unit 22 is shared by all users set in the subscriber information storage unit 22.

With this configuration, in the present embodiment, it is possible to notify the user that, even when the user has not previously received the call from a phone number, the phone number of the call corresponds to the suspicious call. In other words, even when the user has not previously received the call or has not registered the call as the suspicious call, the alert guidance is transmitted to the user on receiving the suspicious call such that the user is warned. Thus, the user can aware, before responding to the call, that the call corresponds to the suspicious call. Accordingly, the user is allowed to respond to the suspicious calls carefully and cautiously, resulting in a prevention of the crimes such as communications fraud or leaks of personal information.

Further, in the present embodiment, the suspicious call information registered by a contract user is shared by all of the users set in the subscriber information storage unit 22. As described above, in the present embodiment, the suspicious call information is shared by all of the users, and thus, it is also possible to warn the users who do not contract the suspicious call rejection service when receiving calls from the suspicious persons.

Note that, the blacklist may be generated based on feedback information from the users, but in this case, a dedicated apparatus is additionally required for the feedback information from the users, which makes it difficult to introduce the blacklist of this type. On the other hand, in the present embodiment, without using any dedicated apparatus, the user can be warned on receiving suspicious calls and the suspicious calls can be registered in the blacklist.

Hardware Configuration

Figure 8:
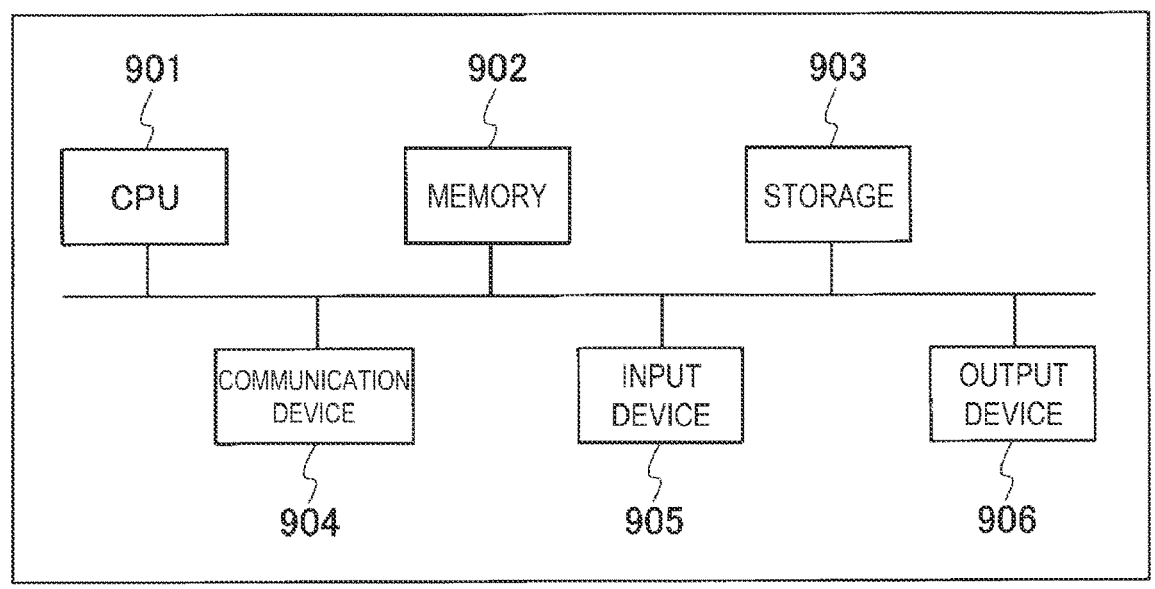
FIG. 8 is a diagram illustrating an example of a hardware configuration.

The SIP server 1 and the HSS server 2, each of which has been described above, may use a computer system for general use as illustrated in FIG. 8. The illustrated computer system includes a central processing unit (CPU, processor) 901, a memory 902, a storage 903 (hard disk drive: HDD, solid state drive: SSD), a communication device 904, an input device 905, and an output device 906. The memory 902 and the storage 903 are storage devices. In the computer system, the CPU 901 executes a predetermined program loaded in the memory 902 to cause each apparatus to serve the corresponding function. For example, a CPU in the SIP server 1 executes a program for the SIP server 1 to cause the SIP server 1 to serve its function, and a CPU in the HSS server 2 executes a program for the HSS server 2 to cause the HSS server 2 to serve its function.

Alternatively, the SIP server 1 and the HSS server 2 may be implemented by a single computer or may be implemented by a plurality of computers. Still alternatively, the SIP server 1 and the HSS server 2 may be a virtual machine implemented by a computer.

The program for the SIP server 1 and the program for the HSS server 2 may be stored in a computer-readable storage medium such as the HDD, the SSD, a universal serial bus (USB) memory, a compact disc (CD), or a digital versatile disc (DVD), or alternatively, may be distributed via the network.

The present disclosure is not limited to the above-described embodiments and modifications, and various modifications may be made within the scope of the gist of the present disclosure.

For example, in the foregoing embodiment, when the number of users that have sent the registration requests of the suspicious call number exceeds the threshold (first threshold), the SIP server registers the suspicious call number in the blacklist. The SIP server may determine whether to register the suspicious call number in the blacklist based on, not only the number of users that have sent the registration requests, but also the number of incoming suspicious call. More specifically, the SIP server may, by counting the number of incoming calls from each of the suspicious call numbers registered in the suspicious call information, register the corresponding phone number in the blacklist when the number of incoming calls exceeds the threshold (second threshold). The number of incoming calls may be the cumulative number of incoming calls for all users or may be the number of incoming calls for each user. Accordingly, even when the number of users that have sent the registration requests of the suspicious call is smaller than the threshold predetermined, as long as the number of incoming calls is greater than the threshold, the SIP server may register the suspicious call with the high number of incoming calls in the blacklist 13.

In the foregoing embodiment, the HSS server includes the subscriber information storage unit, and the SIP server accesses the HSS server when processing the call and acquires the user attribute information related to the incoming destination. Alternatively, the SIP server may include the subscriber information storage unit and register (reflect) the suspicious call number that the users that has received the suspicious call requests for registration in the subscriber information for all of the users set in the subscriber information storage unit. For example, the SIP server 1 holds, by periodically downloading the subscriber information held in the subscriber information storage unit of the HSS server, the subscriber information in the SIP server 1. Then, the SIP server may perform the similar processing on the subscriber information (user attribute information) held therein as the management unit 21 of the HSS server 2 allows the other users to share the suspicious call information, and the SIP server may periodically upload the updated subscriber information to the subscriber information storage unit 22 of the HSS server 2 as a backup. Note that, the SIP server 1 may download the subscriber information entirely, or alternatively, may download only the user attribute information out of the subscriber information.

REFERENCE SIGNS LIST

1: SIP server (call processing apparatus)
11: Call processing unit
12: Registration unit
13: Blacklist
2: HSS server (subscriber server)
21 Management unit
22: Subscriber information storage unit
3: ENUM server
4: Media server
5: SIP terminal

The invention claimed is:

1. A call processing apparatus comprising one or more processors configured to:
   receive a registration request of a suspicious call number from a user receiving a suspicious call;
   register the suspicious call number as first suspicious call information of the user in a subscriber information storage unit;
   add the suspicious call number into second suspicious call information of other users in the subscriber information storage unit to share the suspicious call number across multiple different users;
   receive a first call from a first outgoing source that requests to connect with a first incoming destination terminal of a first called user;
   determine that the first outgoing source of the first call is a suspicious call number included in the first or second suspicious call information registered in the subscriber information storage unit;
   determine that the suspicious call number of the first call is included in a blacklist,
   determine that the first called user is a contract user contracting a suspicious call rejection service,
   in response to determining that the first called user is a contract user, disconnect the first call;
   receive a second call from a second outgoing source that requests to connect with a second incoming destination terminal of a second called user;
   determine that the second outgoing source of the second call is a suspicious call number included in the first or second suspicious call information registered in the subscriber information storage unit;
   determine that the suspicious call number of the second call is included in the blacklist;
   determine that the second called user is not a contract user contracting the suspicious call rejection; and
   in response to determining that the second called user is not a contract user, transmit an alert guidance to the second incoming destination terminal before connecting the second call.

2. The call processing apparatus according to claim 1, wherein the call processing apparatus is configured to:
   when a number of users sending registration requests for the suspicious call number exceeds a first threshold, (i) register, in the blacklist, the suspicious call number, and (ii) disconnect a call from the suspicious call number registered in the blacklist.

3. The call processing apparatus according to claim 1, wherein the call processing apparatus is configured to:
   when a number of incoming calls from the suspicious call number exceeds a threshold, (i) register, in the blacklist, the suspicious call number, and (ii) disconnect a call from the suspicious call number registered in the blacklist.

4. The call processing apparatus according to claim 1, wherein the call processing apparatus is configured to register the suspicious call number included in the registration request in subscriber information of the other users in the subscriber information storage unit.

5. The call processing apparatus according to claim 1, wherein the calling processing apparatus is further configured to:
   receive a third call from a third outgoing source that requests to connect with a third incoming destination terminal of a third called user;
   determine that the third outgoing source of the third call is a suspicious call number included in the first or second suspicious call information registered in the subscriber information storage unit;
   determine that the suspicious call number of the third call is not included in the blacklist; and
   in response to determining that the suspicious call number of the third call is not included in the blacklist, transmit the alert guidance to the third incoming destination terminal before connecting the third call.

6. A call processing system comprising:
   one or more processors, configured to:
   receive a registration request of a suspicious call number from a user receiving a suspicious call;
   register the suspicious call number as first suspicious call information of the user in a subscriber information storage unit;
   add the suspicious call number into second suspicious call information of other users in the subscriber information storage unit to share the suspicious call number across multiple different users;
   receive a first call from a first outgoing source that requests to connect with a first incoming destination terminal of a first called user;
   determine that the first outgoing source of the first call is a suspicious call number included in the first or second suspicious call information registered in the subscriber information storage unit;
   determine that the suspicious call number of the first call is included in a blacklist,
   determine that the first called user is a contract user contracting a suspicious call rejection service,
   in response to determining that the first called user is a contract user, disconnect the first call;
   receive a second call from a second outgoing source that requests to connect with a second incoming destination terminal of a second called user;
   determine that the second outgoing source of the second call is a suspicious call number included in the first or second suspicious call information registered in the subscriber information storage unit;
   determine that the suspicious call number of the second call is included in the blacklist;
   determine that the second called user is not a contract user contracting the suspicious call rejection; and
   in response to determining that the second called user is not a contract user, transmit an alert guidance to the second incoming destination terminal before connecting the second call; and
   a subscriber server,
   wherein the subscriber server includes the subscriber information storage unit and a management unit, implementing the one or more processors, configured to register the suspicious call number included in the registration request in subscriber information of the other users in the subscriber information storage unit.

7. The call processing system according to claim 6, wherein the one or more processors are further configured to:
   receive a third call from a third outgoing source that requests to connect with a third incoming destination terminal of a third called user;
   determine that the third outgoing source of the third call is a suspicious call number included in the first or second suspicious call information registered in the subscriber information storage unit;
   determine that the suspicious call number of the third call is not included in the blacklist; and in response to determining that the suspicious call number of the third call is not included in the blacklist, transmit the alert guidance to the third incoming destination terminal before connecting the third call.

8. A call processing method performed by a call processing apparatus, the call processing method comprising:
receiving a registration request of a suspicious call number from a user receiving a suspicious call;
registering the suspicious call number as first suspicious call information of the user in a subscriber information storage unit;
adding the suspicious call number into second suspicious call information of other users in the subscriber information storage unit to share the suspicious call number across multiple different users;
receiving a first call from a first outgoing source that requests to connect with a first incoming destination terminal of a first called user;
determining that the first outgoing source of the first call is a suspicious call number included in the first or second suspicious call information registered in the subscriber information storage unit;
determining that the suspicious call number of the first call is included in a blacklist;
determining that the first called user is a contract user contracting a suspicious call rejection service,
in response to determining that the first called user is a contract user, disconnect the first call;
receiving a second call from a second outgoing source that requests to connect with a second incoming destination terminal of a second called user;
determining that the second outgoing source of the second call is a suspicious call number included in the first or second suspicious call information registered in the subscriber information storage unit;
determining that the suspicious call number of the second call is included in the blacklist;
determining that the second called user is not a contract user contracting the suspicious call rejection; and
in response to determining that the second called user is not a contract user, (i) transmitting an alert guidance to the second incoming destination terminal before connecting the second call, and (ii) connecting the second call to the second incoming destination terminal.

9. The call processing method according to claim 8, further comprising:
receiving a third call from a third outgoing source that requests to connect with a third incoming destination terminal of a third called user;
determining that the third outgoing source of the third call is a suspicious call number included in the first or second suspicious call information registered in the subscriber information storage unit;
determining that the suspicious call number of the third call is not included in the blacklist; and
in response to determining that the suspicious call number of the third call is not included in the blacklist, transmitting the alert guidance to the third incoming destination terminal before connecting the third call.

* * * * *